United States Patent [19]

Kinberg

[11] Patent Number: 4,988,301

[45] Date of Patent: Jan. 29, 1991

[54] LUMINESCENT WRITING AND DISPLAY DEVICE

[76] Inventor: Benjamin Kinberg, 200 Fifth Ave., New York, N.Y. 10010

[21] Appl. No.: 433,524

[22] Filed: Nov. 8, 1989

Related U.S. Application Data

[63] Continuation-in-part of Ser. No. 315,611, Feb. 27, 1989, Pat. No. 4,927,748.

[51] Int. Cl.[5] ......................... B43L 1/12; G09B 11/00

[52] U.S. Cl. ..................................... 434/410; 434/425

[58] Field of Search ........................ 434/408, 410, 425

[56] References Cited

U.S. PATENT DOCUMENTS 2,596,890 5/1952 Dechert .............................. 434/410
2,697,884 12/1954 Dechert .............................. 434/410
3,949,132 4/1976 Seregely et al. .................... 434/408
4,011,665 3/1977 Port .................................... 434/410
4,396,703 8/1983 Matsumoto et al. ................ 101/465

*Primary Examiner*—Edward M. Coven
*Assistant Examiner*—V. Szczepanik
*Attorney, Agent, or Firm*—Arthur T. Fattibene

[57] ABSTRACT

A writing and display device for producing luminescent images upon application of pressure includes an opaque backing member which is coated to render the backing member with a smooth surface at least on one side thereof. The smooth surface of the backing member is laminated with a flexible plastic sheeting. A translucent or transparent sheet which contains a luminescent dye or pigment is disposed adjacent to and coextensive with the backing member. Upon application of pressure onto the sheet, the interfacing surfaces adhere to each other to thereby produce a luminescent image.

1 Claim, 1 Drawing Sheet

LUMINESCENT WRITING AND DISPLAY DEVICE

CROSS-REFERENCES TO RELATED APPLICATIONS

This is a continuation-in-part of application Ser. No. 07/315,611, filed Feb. 27, 1989, now U.S. Pat. No. 4,927,748.

BACKGROUND OF THE INVENTION

The present invention relates to a writing and display device for producing semipermanent luminescent images.

Conventional writing and display devices include a translucent or transparent sheet which contains a luminescent dye and a complementary opaque sheet which is disposed contiguous adjacent to, and coextensive with, the translucent or transparent sheet. Upon application of a pressure by means of for example a stylus or the like, the two sheets tend to adhere to one another along the points of applied pressure to produce a luminescent image. The translucent or transparent sheet as well as the complementary opaque sheet are made of plastic material, usually vinyl. Writing and display devices of this type are disclosed for example in U.S. Pat. Nos. 3,761,343 or 4,011,665.

As it is generally known, an electrostatic charge is produced on the surface of a plastic when it is separated from another surface. The static charge increases as the plastic is handled and attracts dust particles. It has been observed in prior art display devices of the above type, that the build up of static charges and the attraction of dust particles resulted in images in form of clusters, dots or lines even though no outside pressure was applied. This effect could be observed within a relative short time so that the playing value of the display device deteriorates rapidly to a point where the device was no longer interesting or amusing.

A further problem encountered with prior art display devices of this type relates to the manufacture of the game. The coextensive sheets are usually made of pliable vinyl material. Vinyl is, however, a material which is difficult to handle in a machining process because of its flexible properties so that consistent quality of the sheets is difficult to attain and assembling of the device becomes a problem.

SUMMARY OF THE INVENTION

It is thus a general object of the present invention to provide an improved writing and display device obviating the afore-stated drawbacks.

This object and others which will become apparent hereinafter are attained in accordance with the present invention by coating an opaque backing member to render it with a smooth surface and laminating the smooth surface of the backing member with an ultra thin substantially transparent flexible sheeting made of plastic material. A substantially transparent plastic sheet is disposed contiguous to the backing member and in interfacing relationship therewith and has a luminescent tinting material dispersed therethrough so that upon application of pressure on the plastic sheet a luminescent image is formed at the points of applied pressure.

Suitably, the backing member is rigid and may be coated with a shellac which provides the backing member with a smooth surface. The sheeting applied on the smooth surface of the backing member is an ultra thin film of a thickness preferably in the range of approximately 0.0005 to 0.001 inch and may suitably be made of polyethylene, polypropylene or polyvinyl or any other suitable material.

By laminating the backing member with such an ultrathin, substantially transparent film, the electrostatic charge is considerably decreased than in prior art devices which use two overlying vinyl sheets. Moreover, the manufacture of the display device is considerably facilitated as the film is applied on a rigid backing member which may be of any suitable material.

According to a further feature of the present invention, the translucent or transparent plastic sheet is formulated with a primary plasticizer that resists migration, exudation or volatilization out of the surface of the plastic sheet, e.g. vinyl sheet under normal or storage conditions. Transparent sheets employed in conventional display devices used luminescent dyes which showed a tendency to migrate or bleed out of the plastic sheet onto the underlying opaque sheet. In a relatively short period of time, the underlying opaque sheet would absorb the migrated dye and assume the color thereof, resulting in a loss of the brilliance of the images. The formulation of the transparent sheet with a primary plasticizer, preferably a primary low volatile plasticizer, obviates this migrating effect.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
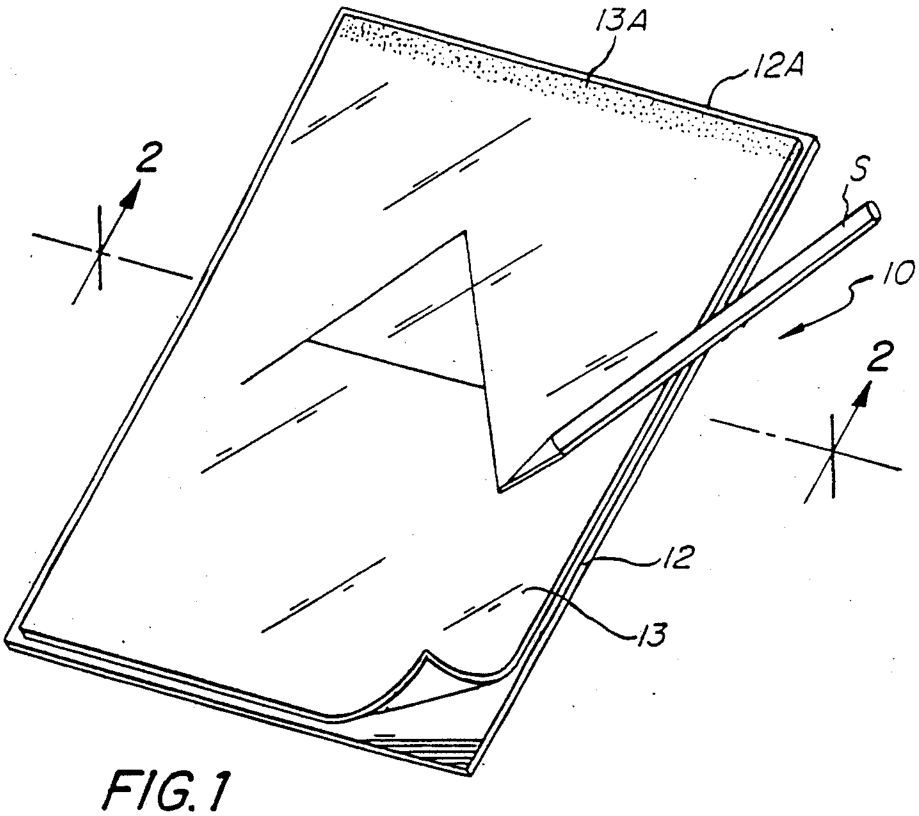
FIG. 1 is a perspective view of one embodiment of a writing and display device in accordance with the present invention.

Referring now to the drawing, and in particular to FIG. 1, there is shown a perspective view of one embodiment of a writing and display device in accordance with the present invention and generally designated by reference numeral 10. It will be readily recognized that the writing and display device is shown only by way of example and may take various forms to resemble for example a writing tablet, pad or slate. The writing and display device 10 includes a backing member 12 which can be made of any suitable rigid material such as cardboard, non-pliable plastic, metal or the like. The backing member 12 is preferably white and opaque to display a white or "milk color" opacity.

Disposed adjacent to and coextensive with the backing member 12 in interfacing relationship is a transparent or translucent pliable sheet 13 of plastic material such as vinyl which has a smooth, wettable type surface appearance. Dispersed through the plastic sheet 13 is a luminescent or fluorescent tinting material, e.g. a dye or pigment to result in a transparent or translucent tinted sheet. It will be appreciated that throughout the description the terms luminescent, fluorescent, iridescent, phosphorescent and glowing are considered to be synonymous in describing the nature of the dye or pigment and the effect or appearance of the image displayed.

Essentially, the nature of the dye or pigment dispersed throughout the plastic sheet 13 is such so as to produce a glowing or luminescent image when applying a pressure thereto.

The plastic sheet 13 is suitably formulated with a primary plasticizer, preferably with a primary low volatile plasticizer in order to prevent the luminescent dye or pigment from migrating onto the underlying opaque sheet 12. Suitable plasticizers for formulating the luminescent plastic sheet 13 may include diisodecyl phthalate, trialkyl trimellitates, e.g. trioctyl trimellitate, epoxidized soya oil or other epoxidized fatty esters, polymeric plasticizers such as adipic acid or azelaic acid polyesters of molecular weight 850–6000 made from dicarboxylic acids such as adipic or azelaic acid, e.g. the PARAPLEX plasticizers made by C. P. Hall Co. of Chicago, Ill.

Migration can be further prohibited or minimized by dispersing fluorescent pigments rather than dyes throughout the plastic sheet 13. While pigments, in contrast to dyes, are solid particles, they are so finely divided that they can be readily dispersed to form a transparent colored or tinted plastic film or sheet that is extremely suitable for application as a luminescent or fluorescent writing and display device.

Figure 2:
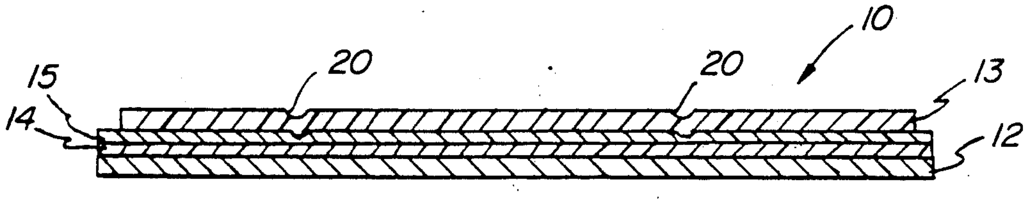
FIG. 2 is a cross sectional view taken along the line II—II in FIG. 1.

Turning now to FIG. 2, there is shown a cross sectional view of the writing and display device 10 taken along the line II—II. As can be seen therefrom, a coating 14 is applied at least on one side of the backing member 12 so as to render its surface flat and smooth. The coating 14 may be a suitable resin such as shellac or any other material which provides the backing member with a smooth surface. Extending coextensive above the coating 14 is a substantially transparent, flexible, plastic sheeting or film 15 which is laminated to the backing member 12 by means of e.g. an adhesive or through heat sealing. It will be appreciated that the use of the term "substantially transparent" should be understood to include "transparent, translucent, clear etc." Preferably, the sheeting 15 has a thickness of less than 0.001 inch, preferably about 0.0005 inch and may be made of polyethylene, polypropylene, polyvinyl or the like. It will be readily recognized that for the sake of clarity, the cross sectional view of FIG. 2 shows the coating 14 and the sheeting 15 with greatly exaggerated dimensions relative to the backing member 12 and plastic sheet 13.

By laminating the backing member 12 with an ultrathin film 15, a build up of an electrostatic charge between the plastic sheet 13 and the backing member 12 is greatly reduced when comparing with conventional plastic vinyl sheets as used in prior art devices. The formation of undesired displays and the attraction of dust particles are thus avoided.

Figure 3:
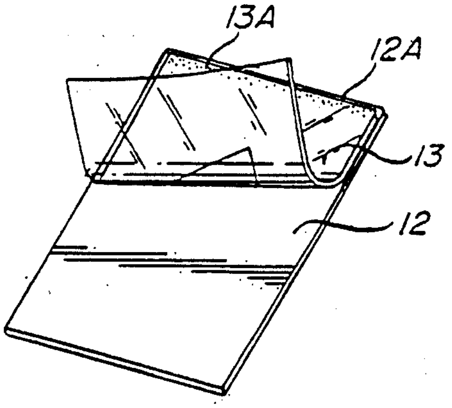
FIG. 3 is a perspective view of the writing and display device of FIG. 1, illustrating the manner as to how a formed image may be readily erased.

The plastic sheet 13 is suitably secured in overlying position relative to the opaque backing member 12 along one edge thereof, e.g. along edge 13A, by suitable means to form a hinging connection therebetween. This may be effected by adhesively securing the edge portion 13A of plastic sheet 13 to the contiguous edge 12A of the backing member 12, by heat sealing, by a binding hinge strip of material, by tacking or any other suitable hinging construction. As shown in FIG. 3, the hinging effect renders the plastic sheet 13 and the backing member 12 readily separable by lifting the plastic sheet 13 from the backing member 12.

In operation, upon applying a pressure onto the translucent or transparent plastic sheet 13 e.g. by a stylus S, the applied pressure causes the plastic sheet 13 to adhere to the sheeting 15 on the backing member 12 at the points of applied pressure by forming corresponding depressions 20 as indicated in FIG. 2 so that light reflecting there at creates a luminescent image. As the interfacing surfaces of the plastic sheet 13 and the sheeting 15 of the backing member 12 have a smooth, wetlike appearance, they tend to remain adhered or cohered to one another along the depressions 20 of applied pressure to sustain the luminescent image until the intimate contact between the plastic sheet 13 and sheeting 15 is broken. This can be readily attained by lifting the plastic sheet 13 away from the backing member 12 as shown in FIG. 3 to thereby separate the plastic sheet 13 from the sheeting 15.

It will be appreciated that the image may also be erased by other suitable separating means which may be disposed between the plastic sheet 13 and the sheeting 15 of the backing member 12 and attain effective separation of the plastic sheet 13 from the sheeting 15 along the points of applied pressure.

While the invention has been illustrated and described as embodied in a luminescent writing and display device, it is not intended to be limited to the details shown since various modifications and structural changes may be made without departing in any way from the spirit of the present invention.

What is claimed as new and desired to be protected by Letters Patent is set forth in the appended claims:

1. An improved writing and display device for producing a semi-permanent luminescent image upon the application of a writing pressure thereon comprising
   - a rigid backing member formed of an inexpensive cardboard material,
   - said backing member having a smooth, opaque surface,
   - a transparent thin film of a plastic material,
   - said transparent film being ultra thin with a thickness in the range of 0.001 to 0.0005 inches and said ultrathin film being adhesively secured to the opaque surface of said backing member,
   - a transparent plastic sheet containing a luminescent tinting material integrally dispersed throughout said plastic sheet,
   - said tinted transparent plastic sheet being disposed in overlying relationship to said transparent thin film,
   - said tinted transparent plastic sheet and said transparent thin film each having a smooth surface for direct contact at the interface thereof,
   - and said tinted transparent sheet being pliable so that upon the application of a pressure thereon, the respective smooth surfaces of said transparent sheet and transparent film are urged into intimate contact at the points of applied pressure to form a luminescent image along the points of applied pressure that will be retained thereon so long as said transparent tinted sheet and said transparent film are adhered to one another along the points of applied pressure, said luminescent image being erased by effecting separation of said tinted transparent sheet and said ultra thin film,
   - said ultra thin film adhesively being secured to said backing member operating to minimize any electrostatic charge produced between said transparent sheet and underlying film during separation thereby eliminating any build-up of dust on the interfacing surfaces thereof,
   - said thin film being selected from the group consisting of polyethylene, polypropylene and polyvinyl.

* * * * *